March 13, 1934.   J. GLEASON   1,950,670
BAKE OVEN
Filed March 23, 1932   4 Sheets-Sheet 1

INVENTOR.
JAMES GLEASON
ATTORNEY.

March 13, 1934.  J. GLEASON  1,950,670
BAKE OVEN
Filed March 23, 1932  4 Sheets-Sheet 2

INVENTOR.
JAMES GLEASON
BY
ATTORNEY.

March 13, 1934.   J. GLEASON   1,950,670
BAKE OVEN
Filed March 23, 1932   4 Sheets-Sheet 4

INVENTOR.
JAMES GLEASON
BY
ATTORNEY.

Patented Mar. 13, 1934

1,950,670

UNITED STATES PATENT OFFICE 1,950,670

BAKE OVEN

James Gleason, Green Bay, Wis.

Application March 23, 1932, Serial No. 600,795

2 Claims. (Cl. 107—63)

The invention relates to bake ovens and more especially to oil heated ovens.

The primary object of the invention is the provision of an oven of this character, wherein fluid such as oil is heated and circulated within the oven at a determined temperature, while the circulation of such fluid is automatically controlled so as to protect the circulating system from becoming overheated in event of the pump of the latter becomes stalled or otherwise effective for complete circulation of the fluid during the working of the oven.

Another object of the invention is the provision of an oven of this character, wherein the same contains a multiplicity of heater coils or courses, so that a uniformity of heat throughout said oven is constantly maintained and a balanced distribution had, thus assuring a perfect working of the oven while in use.

A further object of the invention is the provision of an oven of this character, wherein a motor and pump driven thereby circulate hot fluid from a heater through oven coils within the oven and back through heater, while a safety device in the character of a magnetic valve is arranged in the motor circuit so that when the motor stops the fuel supply will be cut off and a temperature control within the oven automatically opens and closes for regulating the temperature within the said oven.

A still further object of the invention is the provision of an oven of this character, which is comparatively simple in construction, thoroughly reliable and efficient in operation, fully automatic in its working, strong, durable and inexpensive to manufacture and install.

With these and other objects in view the invention consists in the features of construction, combination and arrangement of parts as will be hereinafter more fully described, illustrated in the accompanying drawings which disclose the preferred embodiment of the invention, and pointed out in the claims hereunto appended.

In the accompanying drawings:

Figure 5 is a fragmentary sectional view taken on the line 5—5 of Figure 3 looking in the direction of the arrows.

Similar reference characters indicate corresponding parts throughout the several views in the drawings.

Figure 1:
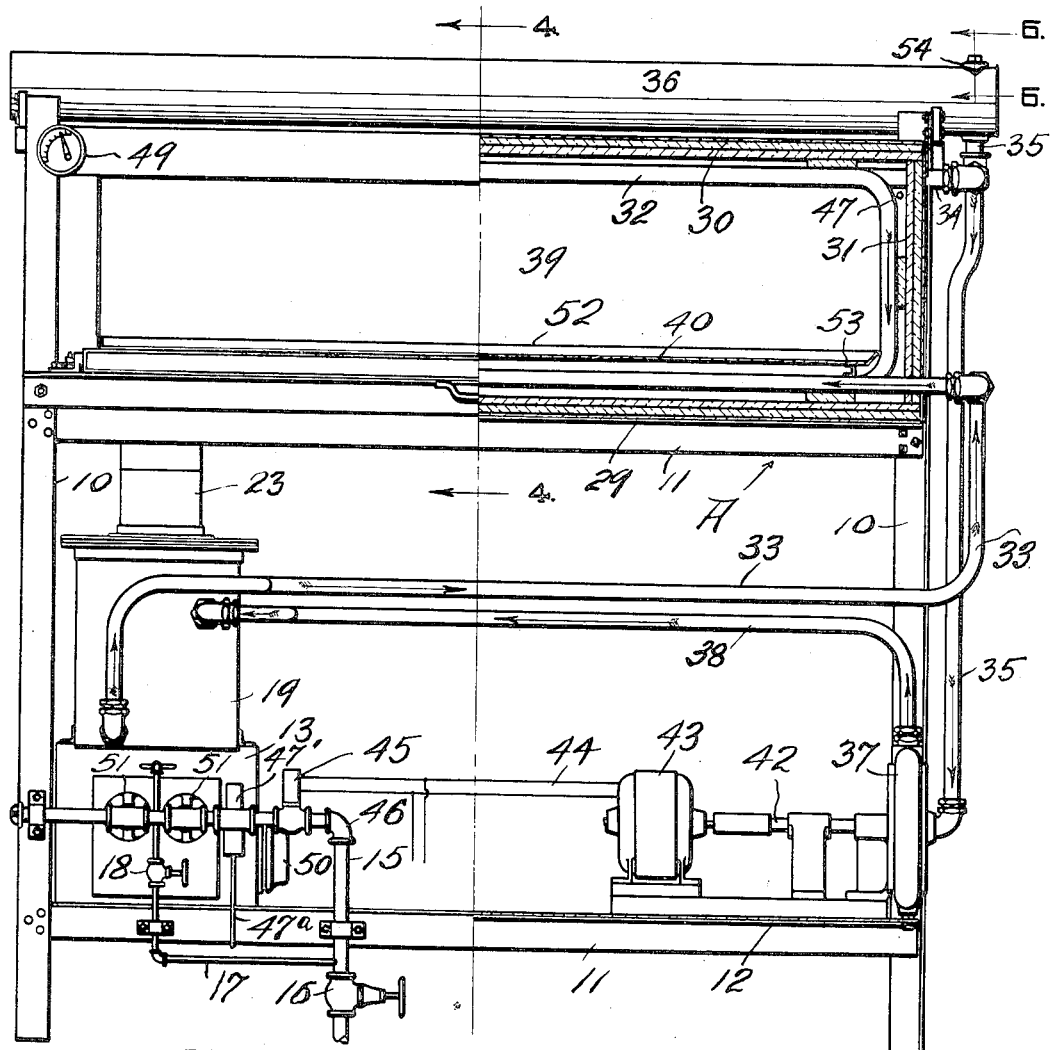
Figure 1 is a front elevation looking into the oven chamber, the right hand portion of oven being in section with the circulating coils therein exposed.
Figure 6:
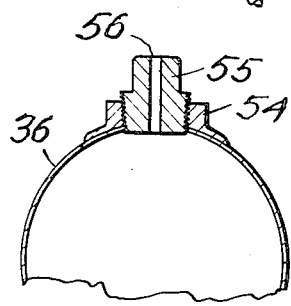
Figure 6 is a detail sectional view on the line 6—6 of Figure 1 looking in the direction of the arrows.
Figure 2:
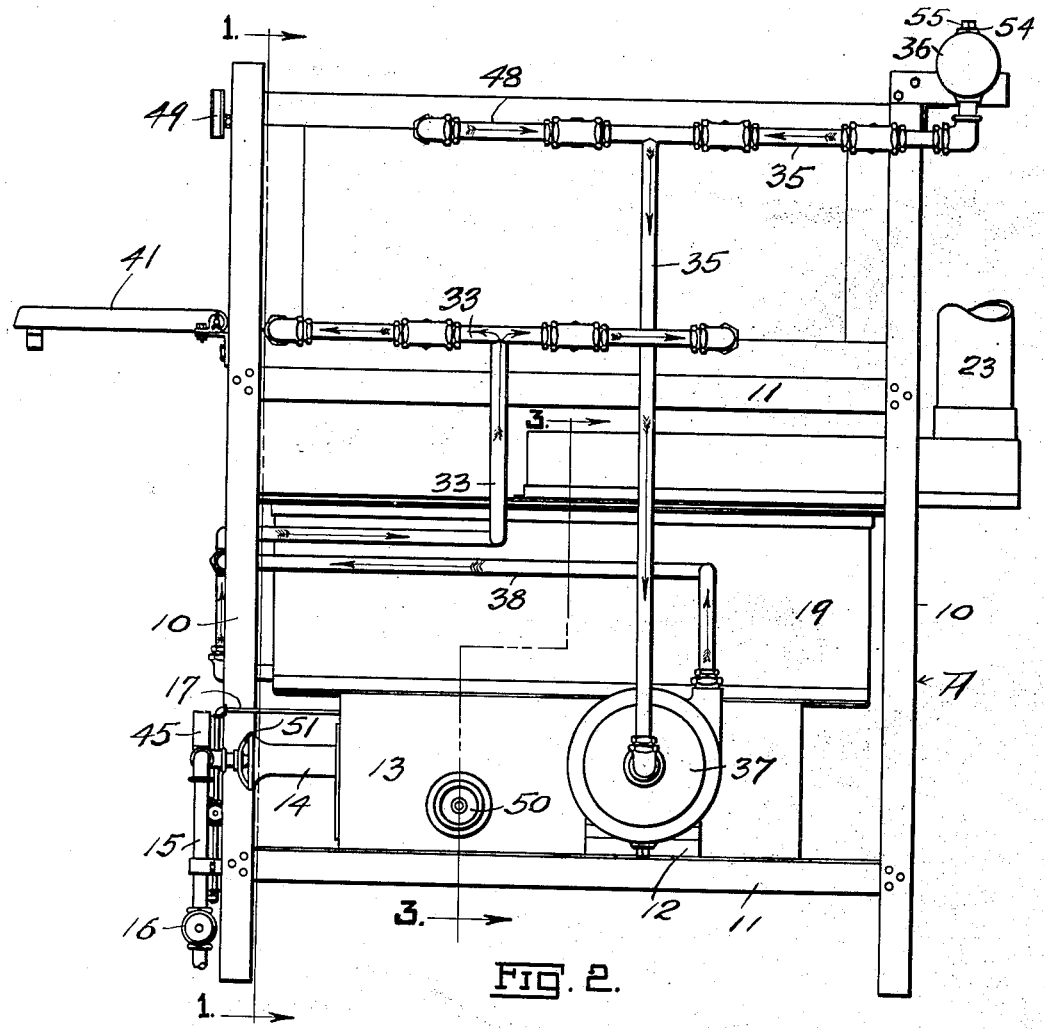
Figure 2 is a side elevation of the oven constructed in accordance with the invention.

Referring to the drawings in detail, A designates generally the supporting body structure of the oven and includes vertical corner posts 10, preferably made from angle irons, although they may be otherwise formed, with which are bolted or otherwise secured superposed cross angle pieces 11. On the lowermost cross pieces 11 close to the base or foundation upon which rests the body structure A is a platform 12. This platform 12 carries a heater 13 equipped with burners 14, preferably a pair of the same, having their leads from a fuel supply pipe 15, such as a gas main, the same being provided with a hand operated cut-off valve 16. This pipe or main 15 is fitted with a pilot light lead 17 having a hand operated regulating and cut-off valve 18 of any standard construction or type, the pilot burner (not shown) being within the heater 13.

Figure 3:
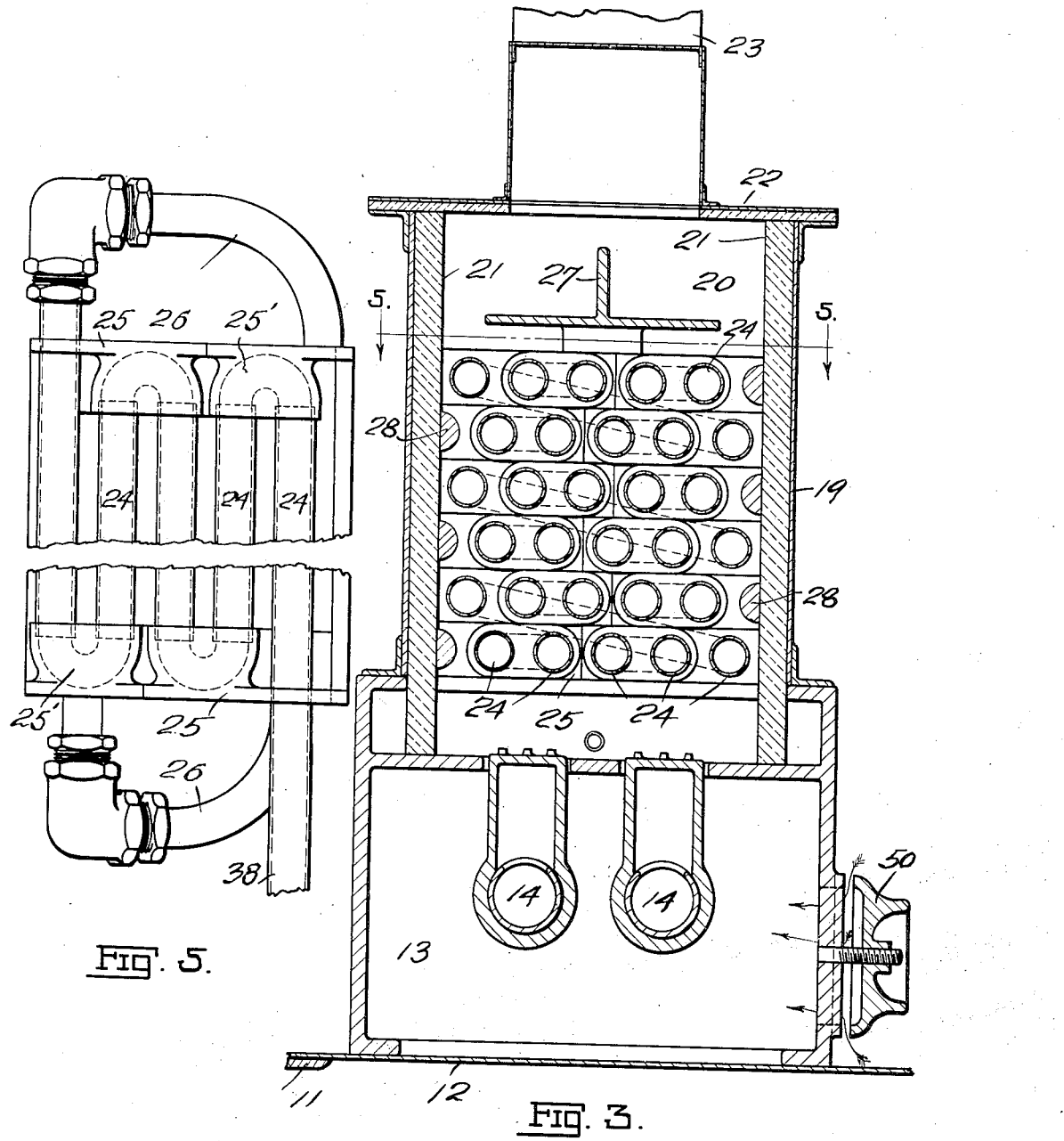
Figure 3 is a sectional view on the line 3—3 of Figure 2 looking in the direction of the arrows.
Figure 4:
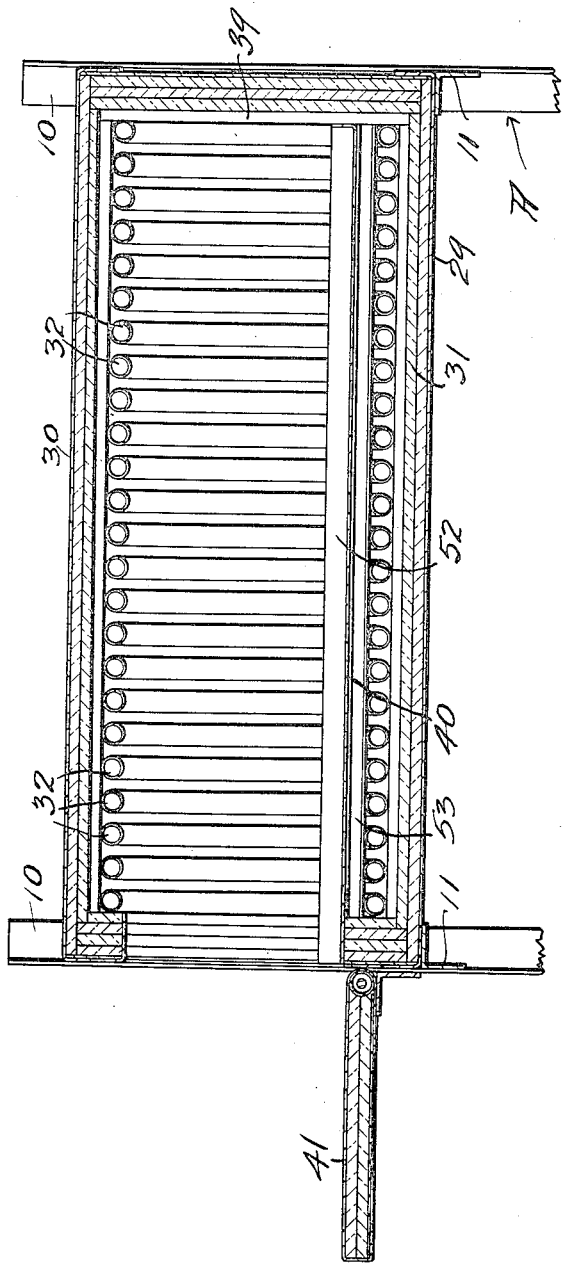
Figure 4 is a fragmentary sectional view on the line 4—4 of Figure 1.

The heater 13 is formed with an upper head 19 forming a heating chamber 20 and is provided with inner insulating walls 21 and a top 22, the latter being extended to overhang the lower portion of the heater as will be apparent in Figure 3 of the drawings. From this top 22 extends the smoke flue 23.

Suitably supported with the heating chamber 20 is an assembly of staggered horizontally arranged tubes 24, these being circuitous and include substantially rectangular pads 25 on their return bends 25', which pads form the ends of heat chambers 20 and bends 26 are in separate spaces provided outside of the chamber 20 and thus are protected from intense heat within the latter. Above the assembly of tubes 24 is an inverted substantially T-shaped baffle 27 so as to maintain the products of combustion or hot gases spread all over the heating chamber while provided at 28 are half rounds 28' which fashion to maintain equal circulating passages.

Near the top of the body structure A and supported by the cross pieces 11 on the posts 10 at a platform 29 is an oven unit preferably in the form of a sheet iron lined box 30 provided with suitable heat insulation 31 closely surrounding heating coils 32, these being vertically disposed in a horizontal row in close spaced relation to each other.

The tubes 24 have communication with the coils 32 through the pipe or conduit 33, while said coils 32 through the pipe or conduit 34 has communication with a fluid feed or delivery pipe 35 leading from an expansion tank or reservoir 36, the latter being supported at the top of the body structure A, which pipe 35 is coupled with a circulating pump 37 mounted upon the platform 12. This pump 37 has communication with the tubes 24 by pipe or conduit 38.

The coils 32 constitute circulating coils and within the oven compartment 39 is a bottom or hearth 40, the compartment being accessible through a doorway closed by a pivoted door 41 at the front of the oven unit.

The pump 37 is driven from a power shaft 42 of an electric motor 43, of any approved type arranged in a circuit 44 of any suitable current supply, while within this circuit is located a magnetic valve 45 which is located within the fuel supply pipe 15 close to the elbow 46 therein. This valve 45 opens when the circuit is closed and automatically shuts off the fuel supply through said pipe 15 should the motor 43 stop or the current ceases or if both are stopped for any reason whatever.

Located within the compartment 39 of the oven unit preferably at the upper right hand corner thereof is a thermostatic bulb 47, the same being shown diagrammatically in Figure 1 of the drawings and is of any suitable standard equipment which maintains a constant temperature in the compartment 39. This bulb 47 is preferably placed outside of the coils 32 and under outlet to discharge manifold 48 joined with the pipe 35. A valve 47' in the gas line 15 is connected to bulb 47 by capillary tube 47a, as shown in Figure 1 of the drawings.

The valve 45 is wired with the motor 43 in such a way that when the latter idles the said valve 45 will close.

At the front of the oven unit is a thermometer 49 which clearly indicates to an operator of the machine temperature variations, so that by observation thereof he can adjust the thermostatic valve 47' to hold the desired temperature in the oven compartment 39. Once this valve 47' is adjusted the oven compartment will heat up to the set temperature as may be desired.

The coils 24 and 32 as well as the pipes or conduits leading to and from the pump 37 which is the fluid circulating system is filled with fluid such as oil or other heating medium so that there is very little of the fluid in the tank 36 when cold. When the compartment 39 is up to working temperature the fluid will expand to nearly fill the tank but the fluid in said tank will not be hot when the compartment is at full or set temperature.

The heater 13 at one side thereof is provided with a valve 50 for controlling the amount of secondary air to the burners 14, the primary air being controlled at the mixers 51 of these burners. In this way the products of combustion are very slightly diluted with free air with the result that the gases travel slowly, due to the reduced volume through the heating coils giving more time for the tubes 24 in the heater to absorb heat from the gases.

Heretofore it has been mentioned oil as a heat carrying medium but this should be construed to mean any fluid which will boil at a temperature considerably above the temperature desired to be circulated.

The bottom or hearth 40 is in the form of a pan with turned up edges 52 all around except at the door 41 so that any spillage inside of the compartment 39 of the oven unit can run out at the door but cannot run out of the pan at the sides and inner end of this compartment. This pan with the channel bars 53 attached to bottom rests on bottom coils of the circulating coils 32 within this compartment 39 as will be apparent.

The tank 36 at its upper side is provided with a filling nipple 54 closed by a removable plug 55 having a vent hole 56 therein and this tank has a capacity to take all of the expansion of the oil or other heating medium used as a heat carrying fluid.

By insulating all exposed pipes or conduits, the oven and heater from loss of heat and by controlling the flow of gases of combustion through heater, this oven will be highly efficient.

The angle iron post 10 extends slightly above the oven unit so that another oven unit may be placed on top and connected up with the piping to make a double deck oven as should be apparent.

The multiplicity of heater coils 32 within the oven unit enables an even distribution of heat and uniformity throughout such unit.

The heater is preferably divided into a burner compartment, tube or heat absorption compartment flame or combustion compartment and a smoke or burnt gas compartment.

What is claimed is:

1. In an oven of the character described, an oven unit having coils therein, a heater having coils communicative with the first named coils, a heat carrying medium within the coils, means for effecting the circulation of the medium through the coils, an expansion tank connected with the coils, and the said means, means for driving the first named means, means for controlling the heater, and an automatic regulator for the heater and coacting with the driving means.

2. In an oven of the character described, an oven unit having coils therein, a heater having coils therein communicative with the first named coils, a heat carrying medium within the coils, means for effecting the circulation of the medium through the coils, an expansion tank connected with the coils and said means, means for driving the first named means, means for controlling the heater and automatically regulated by the driving means, a pilot light for the heater, and means for controlling the temperature within the oven unit.

JAMES GLEASON.